Figure 9:
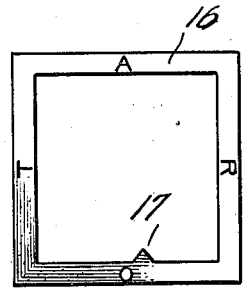

Feb. 9, 1943.　　　　F. J. MANHART　　　　2,310,800
AMUSEMENT AND EDUCATIONAL DEVICE
Filed June 6, 1941　　　　2 Sheets-Sheet 1
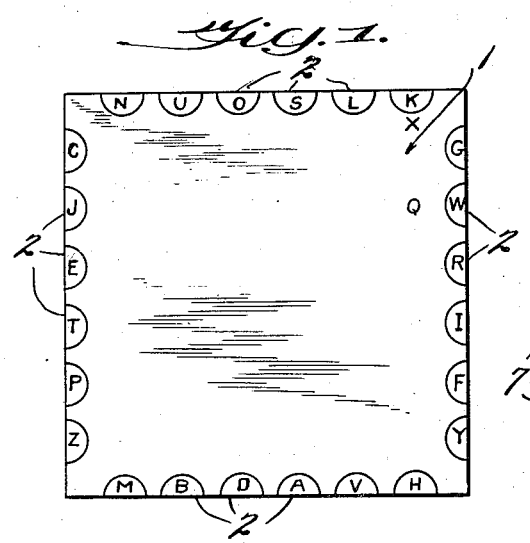
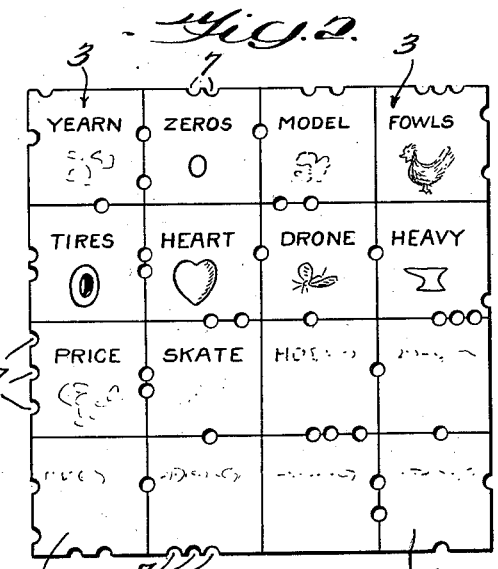
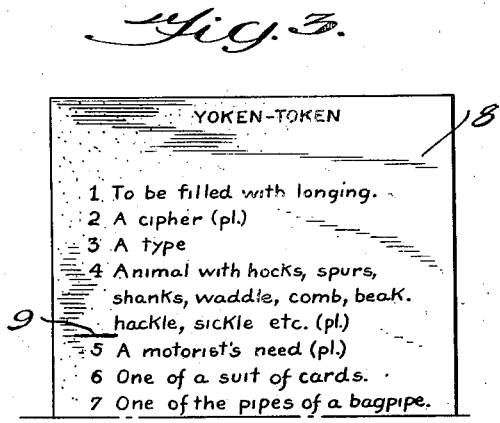
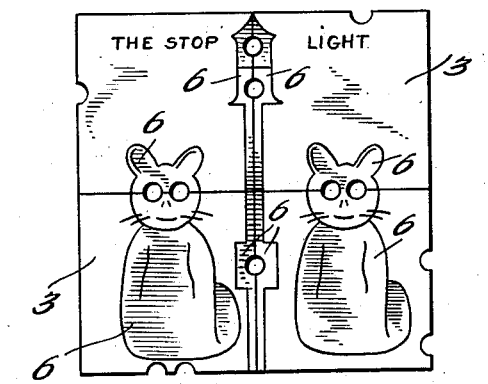
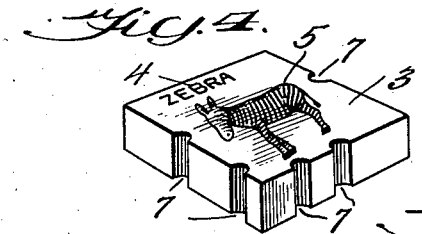
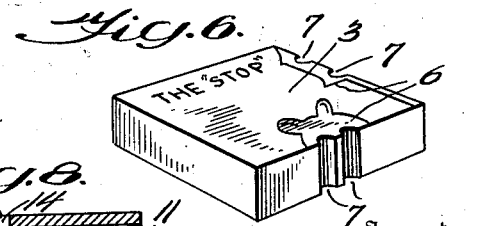
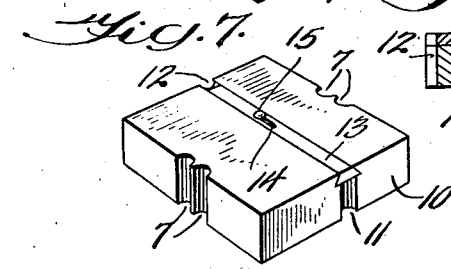

Feb. 9, 1943. F. J. MANHART 2,310,800
AMUSEMENT AND EDUCATIONAL DEVICE
Filed June 6, 1941   2 Sheets-Sheet 2

Inventor:-
Frank J. Manhart,
By Smith, Michael & Gardiner,
Attorneys

Patented Feb. 9, 1943

2,310,800

UNITED STATES PATENT OFFICE 2,310,800

AMUSEMENT AND EDUCATIONAL DEVICE

Frank J. Manhart, Centralia, Va.

Application June 6, 1941, Serial No. 396,935

10 Claims. (Cl. 35—35)

My invention relates to an amusement or educational device, and has particular reference to the provision of a novel set of game pieces or tokens adapted to be arranged in two or more horizontal and/or two or more vertical rows in certain predetermined relation either in accordance with hints or suggestions given on an associated key or chart or in accordance with certain portions of a composite picture, design or the like, the device thus including certain features of the so-called "cross-word" and "jig-saw" puzzles now appearing on the market.

It is an object of my invention to provide a set of game pieces or tokens each of which has on one face thereof a word, picture, symbol or other indicia corresponding to a hint or suggestion given on an associated key or chart, which game pieces or tokens are adapted to be arranged in two or more horizontal and/or two or more vertical rows in accordance with the order or sequence in which said hints or suggestions appear on the associated key or chart. When employed in this manner, the device embodies certain of the features to be found in the conventional "cross-word" puzzles.

It is an object of my invention to provide a set of game pieces or tokens each of which has on one face thereof a complemental section or portion of a picture, design or the like, which game pieces or tokens are adapted to be arranged in two or more horizontal and/or two or more vertical rows in a manner such that the complementary sections or portions of the picture, design or the like contribute to the production of a composite picture, design or the like. When employed in this manner, the device embodies certain of the features to be found in the conventional "jig-saw" puzzles.

It is an object of my invention to provide a set of game pieces or tokens which are adapted to be arranged in predetermined sequence in two or more horizontal and/or two or more vertical rows, and to associate with said game pieces or tokens a novel indicating or "checking" means preferably disposed adjacent the marginal edges of each game piece or token, which means must appear in predetermined definite registering relation when the game pieces or tokens are properly arranged, and which means constitutes a part or portion of said complete composite picture, design or the like when the game pieces or tokens are properly arranged in the respective rows.

It is an object of my invention to provide a set of game pieces or tokens which are adapted to be arranged in predetermined sequence in two or more horizontal and/or two or more vertical rows, and to provide a notch or notches across one or more of the side edges of each game piece or token, which notch or notches are arranged in predetermined, definite positions for each of the several letters of the alphabet, and which notch or notches register with a correspondingly positioned notch or notches on the side edges of adjacent game pieces or tokens only when the game pieces or tokens are properly arranged in the respective horizontal and vertical rows.

It is a further object of my invention to provide a novel key or pattern adapted to indicate to the manufacturer of the device the exact location where a notch or notches are to be cut along the marginal edges of the game pieces or tokens, which key or pattern contains the letters of the alphabet arranged in a predetermined order or sequence along the marginal edges thereof, the arrangement being such that the position of the notch or notches along the marginal edge or edges of the game pieces or tokens will be determined by the letters contained in the word, or by the picture or other indicia appearing on the face of the game pieces or tokens.

It is a still further object of my invention to provide a series of adjustable frames adapted to be arranged in superimposed relation and each having an opening therein corresponding in shape and size to the shape and size of the individual game pieces or tokens, and each provided with an inwardly extending projection or projections corresponding in location to the location of the notch or notches on the edges of the game pieces or tokens, whereby when the proper frames are selected and assembled in superimposed relation, one of the game pieces or tokens may be passed through the superimposed frames with the notch or notches passing over the projections on said frames.

Figure 12:
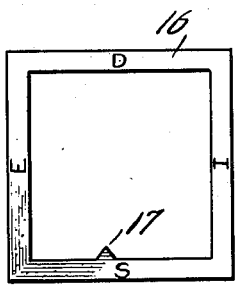
Figure 15:
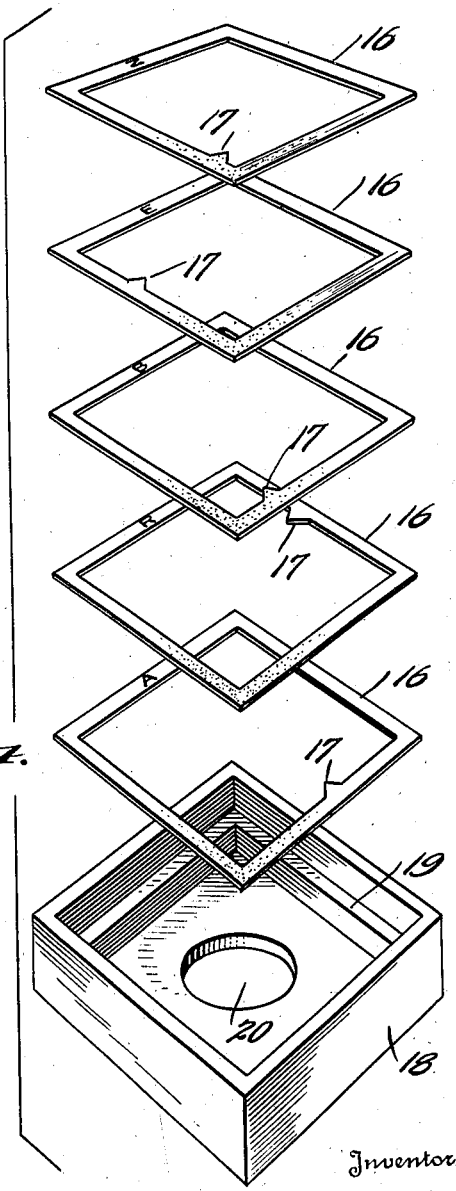
Figure 10:
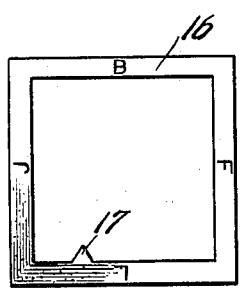
Figure 13:
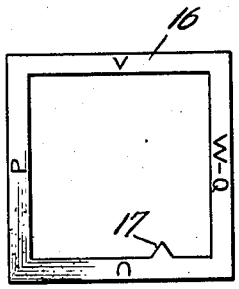
Figure 11:
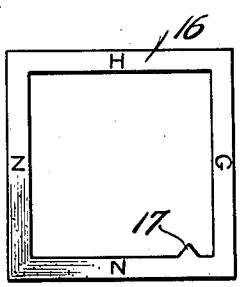
Figure 14:
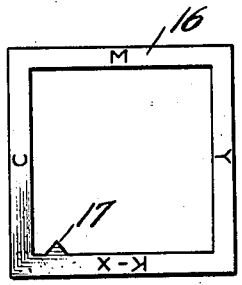

In the accompanying drawings wherein for the purpose of illustration I have shown a preferred embodiment of my present invention, Figure 1 is a plan view of the key or pattern used by the manufacturer of the game pieces or tokens to determine the position of the notch or notches to be formed in the marginal edge or edges of the game pieces or tokens, Fig. 2 is a plan view of a set of sixteen game pieces or tokens, showing each one in its proper position with the notch or notches of adjacent horizontal and vertical rows of blocks in proper registering relation, Fig. 3 is a plan view of a portion of the key or chart on which is printed or otherwise applied the hints or suggestions which determine the proper positioning of the game pieces or tokens in the horizontal and vertical rows, Fig. 4 is a perspective view of one of the game pieces or tokens, Fig. 5 is a plan view of four of the game pieces or tokens arranged to produce a composite picture, design or the like, Fig. 6 is a perspective view of one of the game pieces or tokens shown in Fig. 5, Figs. 7 and 8 are perspective views and sectional views, respectively, of a modified form of game piece or token, Figs. 9 to 11 inclusive are plan views of a set of three frames forming a part of my present invention, these figures showing the arrangement of letters adjacent the marginal edges of each frame and also showing the inwardly extending projections adapted to cooperate with the notch or notches on the edge of the game pieces or tokens;

Figs. 12, 13 and 14 are inverted plan views of the three frames shown in Figs. 9, 10 and 11, respectively, and Fig. 15 is an exploded view showing five of the frames arranged in predetermined relation, and also showing a box or container for use in connection with the frames and the game pieces or tokens.

In the accompanying drawings wherein like reference numerals have been employed to designate like parts throughout the several views, the numeral 1 designates broadly a key or pattern adapted to indicate to the manufacturer of the game pieces or tokens the exact location of a notch or notches to be cut or otherwise formed along the marginal edges of the game pieces or tokens, which key or pattern is preferably square in plan and has arranged on its face adjacent the outer edges thereof, the twenty-six letters of the alphabet, which letters are indicated by the reference numeral 2. Preferably the letters of the alphabet are arranged in rows of six along each side of the key or pattern, with two of the said letters, preferably such letters as "Q" and "X" which are most infrequently used, associated with two of the other letters appearing on the key or chart.

The game pieces or tokens 3 are preferably square in plan and may be blocks, cards or the like composed of wood, cardboard, fibre or any other suitable material. On one face of each game piece or token I print or otherwise apply a word 4 and preferably a picture 5, of the subject, object or person indicated by or corresponding to said word. For example, the game piece or token 3 shown in Fig. 4 has the word "Zebra" printed thereon, as at 4, and also has a pictorial representation, as at 5, of a zebra. On the opposite face of each of the game pieces or tokens 3 I print or otherwise apply a section or portion 6 of a complete or composite picture, design, phrase, sentence or the like. For example, the game piece or token 3 shown in Fig. 6 has a portion of a sentence, i. e., "The stop" and two portions or sections 6 of a composite picture, design or the like appearing thereon, this game piece or token and the indicia appearing thereon being adapted for association, in two or more vertical and two or more horizontal rows, with other game pieces or tokens containing other portions or sections of the composite picture, design, phrase, sentence or the like, all as will be readily apparent from an examination of Fig. 5 of the accompanying drawings.

In order to indicate or "check" the proper arrangement of the game pieces and tokens in the two or more vertical and horizontal rows, I cut or otherwise form along the edge or edges of each game piece or token a vertical notch or notches, each preferably semi-cylindrical throughout its length, which notch or notches have a definite and predetermined relationship to the letters of the word appearing on this face of the game piece or token. The position or location of each notch or notches is determined in accordance with the key or pattern shown in Fig. 1. For example, if a block is to be made having the word "Zebra" thereon, as shown in Fig. 4, the individual letters "Z," "E," "B," "R" and "A" would be located on the key or pattern 1 and vertical notches 7 would be cut or otherwise formed along the edge or edges of the game piece or token in positions corresponding to the positions of the said letters on the key or pattern 1. Hence, there is a definite position or location on the edge or edges of each game piece or token which corresponds to any letter of the alphabet, and once this position or location has been determined by reference to the key or pattern 1, all of the game pieces or tokens on which the same letter or letters appear will have notches provided along their edge or edges in the same identical position or location. With particular reference to Fig. 4 of the accompanying drawings, it is to be noted that the four edges of the block contain a total of five notches, the position or location of each notch corresponding identically to the position or location of the respective letters as such letters appear on the key or pattern 1.

In the accompanying drawings forming a part of this application I have shown my invention in connection with a set of sixteen game pieces or tokens adapted to be arranged in vertical and horizontal rows, each of which contains four individual game pieces or tokens (see Fig. 2). Each of the game pieces or tokens has a word printed or otherwise applied on one face thereof, five-letter words being employed in this illustration of my invention, and preferably also contains on the same face thereof a picture of the subject, object or person indicated or suggested by said word. For example, one of the game pieces or tokens may have the word "TIRES" appearing thereon, together with the pictorial representation of a conventional automobile tire or tires. A plurality of these game pieces or tokens are prepared, each having a five-letter word appearing on a face thereof and each preferably containing an illustration or picture of some subject, object or person of which the said word is indicative or suggestive. Five vertically disposed notches 7 are then cut or otherwise formed on the edges of each game piece or token, which notches are preferably semi-circular in transverse cross-section, it being understood that the relative position of the notches is determined by the letters in the word appearing on the face of each game piece or token and in accordance with the positions which such letters occupy on the key or pattern 1. A plurality of these game pieces or tokens are then arranged or assembled in the form of a square and with four game pieces or tokens in each row, in such a manner that the notches on the edges of adjacent game pieces or tokens register. There will necessarily be certain edges on the game pieces or tokens which are devoid of notches, and, in the proper assembly of the game pieces or tokens, it is desirable that these plain edges on adjacent game pieces or tokens be in abutting relation. The manner of assembling the game pieces or tokens to form a square in which the notches or plain edges on adjacent game pieces or tokens will properly register, is a relatively simple matter, and while the first sixteen game pieces or tokens which the operator attempts to assemble may not be readily assembled in proper relationship, it is a relatively simple matter to select additional game pieces or tokens bearing different words and therefore differently-located notches, and by a "trial and error" or "hit and miss" procedure, to obtain sixteen which can be properly assembled to constitute a complete set. Obviously the key or pattern 1 is of considerable assistance in assembling a set of sixteen game pieces or tokens, as it is readily ascertainable from an examination of said key or pattern 1 which of the letters of the alphabet appear opposite other letters thereof on opposite edges of the game pieces or tokens.

When the game pieces or tokens have been assembled as shown in Fig. 2, it then becomes necessary to prepare a key or chart 8 (see Fig. 3) containing hints or suggestions which will enable a player to assemble the game pieces or tokens in proper order and sequence to form a complete sixteen-piece square. Assuming that the first game piece or token, i. e., the one at the upper left hand corner of the square as viewed in Fig. 2, contains the word "YEARN," then the first hint or suggestion listed on the key or chart 8 would comprise a suggestive phrase or sentence such as "To be filled with longing." If the game piece or token positioned immediately to the right of the first one just mentioned contains the word "ZEROS," the second hint or suggestion to appear on the key or chart 8 would be a phrase or sentence indicative or suggestive of "ZEROS," for example, "Cipher (pl.)." This system is employed for the preparation of a complete key or chart 8 which contains a total of sixteen numbered hints or suggestions, the lists of hints or suggestions being separated by a line or other suitable mark 9 which is positioned after each four hints or suggestions and which functions to indicate that a new row of game pieces or tokens should be started immediately below the preceding row thereof. It will be readily apparent that the key or chart 8 is similar to the key or chart usually furnished with the conventional "crossword" puzzles.

During the manufacture of sets of game pieces or tokens in the manner above referred to, the completed square shown in Fig. 2 may be inverted so that the bottom, plain faces of the game pieces or tokens may be uppermost. The registering semi-cylindrical notches 7 of adjacent game pieces or tokens will appear as circular openings and with these openings as a basis, a suitable picture, design or the like may be printed or otherwise applied to the face of all or a portion of the game pieces or tokens. In Fig. 5 I have shown a composite picture of two cats with an intermediate picture of a post or the like having a stop-light or signal at the top thereof, which composite picture bears the title "The stop-light." This composite picture is composed of four of the game pieces or tokens and it will be particularly noted that the indicating or "checking" notches 7 serve to insure a proper assembly of the four game pieces or tokens and that such notches also constitute a part or portion of the composite picture, i. e., certain of the notches cooperate to form the two eyes of the cats, while others cooperate to form the signal lights of the intermediate post. It will be readily apparent that by this arrangement I provide an amusement or educational device possessing certain features of the conventional "jig-saw" puzzles in which a plurality of game pieces or tokens are assembled to form a composite picture, design or the like.

When the sets of game pieces or tokens and the key or chart 8 have been prepared as above described, they are packed in a suitable box or container and are ready for sale or distribution, either with or without the frames and box to be presently described herein. A child or adult in possession of a set of game pieces or tokens and of the associated key or chart 8 may then indulge in an amusing, interesting and educational pastime, by either arranging the game pieces or tokens after the manner of a "cross-word" puzzle or a "jig-saw" puzzle, i. e., by arranging the game pieces or tokens in accordance with the hints or suggestions appearing on the key or chart 8 or by reversing the game pieces or tokens and building up a composite picture, design or the like from the game pieces or tokens containing sections or portions of a composite picture, design or the like. During assembly of the game pieces or tokens in accordance with the hints or suggestions appearing on the chart 8, the proper position of the game pieces or tokens is indicated or "checked" by the notches 7, it being understood that if the incorrect game piece or token is placed in association with an adjacent game piece or token, in the two or more vertical and horizontal rows the notches on abutting edges of adjacent game pieces or tokens will not register, thus clearly indicating to the player that an improper game piece or token has been selected. The notches 7 also serve as "checks" on the assembly of the game pieces or tokens to form the composite picture, design or the like, i. e., if the notches 7 on adjacent edges of the game pieces or tokens do not register, it becomes readily apparent that an improper game piece or token has been selected.

In order to make the proper assembly of the game pieces or tokens more difficult for the player, one or more of the game pieces or tokens of the set may be constructed as shown in Figs. 7 and 8, in which figures there is shown a game piece or token 10 having a total of six notches arranged along the edges thereof, two of which notches 11 and 12 are positioned in alignment on opposite edges of the game piece or token. The game piece or token 10 is provided with an undercut or dovetail groove or recess which extends completely across the upper surface thereof between the notches 11 and 12. Within this groove is positioned a slide 13 having a slot 14 therein, through which is inserted a nail or the like 15 which penetrates the underlying body portion of the game piece or token 10, the length of the slide 13 and of the slot 14 being such that in one extreme position of the slide, one end thereof will completely cover the notch 11 while in its opposite extreme position, it will cover the notch 12. Such a game piece or token 10 might have on its face along the top portion thereof the word "TIRES" with the final "S" positioned on the upper portion of the slide 13, while the word "IRATE" might be applied on the lower portion of said face with the intermediate letter "A" printed on the lower portion of the slide 13. It will be apparent from the key or pattern 1 that the notches on two of the sides of the game piece or token 10 will be located in identical positions for both the words "TIRES" and "IRATE", as each of these words contains the letters "T", "I", "R" and "E". Then by moving the slide 13 to cover the notch 11 and uncover the notch 12, the five notches will appear in proper locations for the word "TIRES" but not for the word "IRATE." By moving the slide 13 to cover notch 12 and uncover notch 10, the five notches will appear in proper locations for the word "IRATE" but not for the word "TIRES." Thus, if a hint or suggestion for "TIRES" appears as No. "5" on the key or chart 8, for example, "A motorist's need" and the slide 13 has been moved to a position in which the end thereof covers the notch 12, said notch would not register with the corresponding "A" notch on the adjacent game piece or token containing the word "YEARN" and hence the player would temporarily discard this game piece or token and try to find another which would properly fit into this location in the square. After all of the other fifteen game pieces or tokens have been properly positioned in the square, the player would then realize that the remaining game piece or token 10 must be the one required to complete the square whereupon he would move the slide 13 to uncover the notch 12 and simultaneously cover the notch 11 and would find that when the said game piece or token is placed in position the "S" notch on the game piece or token 10 would definitely register with the "A" notch on the game piece or token containing the word "YEARN." One or more of the game pieces or tokens 10 made in accordance with the showings of Figs. 7 and 8 may be employed in a set.

In Figs. 9, 10, and 11 of the accompanying drawings I have shown a series of frames 16 constructed of suitable relatively stiff material and each having a central opening corresponding in shape and size to one of the game pieces or tokens 3 above described. Figs. 12, 13 and 14 show the reverse sides of the frames shown in Figs. 9, 10 and 11, respectively. Each frame 16 has a single, inwardly extending projection 17 at one of the sides thereof and each frame has printed or otherwise applied on the opposite sides of the face of each of the frame borders thereof one or more letters of the alphabet. The relative position of each inwardly extending projection 17 on each of the frames 16 bears a definite predetermined relation to the letters appearing on the four borders of each side of the frame, this relationship corresponding to the position of the letters as they appear on the key or pattern 1, and therefore the position of the notches 7 on the edges of the game pieces or tokens 3. For example, the frame shown in Fig. 9, has an inwardly extending projection 17 located in a position along one border corresponding to the position occupied by the letter "A" on the key or pattern 1. The border of this frame opposite that on which the projection 17 is formed has printed or otherwise applied thereto the letter "A", while the remaining three borders of the frame have applied thereto the letters "T", "R" and "O". When this frame is positioned in a manner such that the letter "T" appears at the top, the projection 17 occupies a position corresponding to the position of the letter "T" on the key or pattern 1. When this frame is positioned in a manner such that the letter "R" is at the top, the projection 17 occupies a position corresponding to the position of the letter "R" on the key or pattern 1. When the frame is positioned in a manner such that the letter "O" is at the top, the projection 17 occupies a position corresponding to the position of the letter "O" on the key or pattern 1. This same relative arrangement of projections and letters is employed for the manufacture of the remaining two frames of each set. Fig. 12 illustrates the reverse side of the frame shown in Fig. 9, it being noted that the four borders of this frame have printed or otherwise applied thereon the letters "D", "E", "I" and "S" and that the projection 17 is so positioned that it bears a definite relation to each of the letter "D", "E", "I" and "S" in accordance with the corresponding positions of said letters on the key or pattern 1. These frames are manufactured in sets of three, each set including frames contain on the two opposite faces thereof the twenty-six letters of the alphabet, it being noted that on the borders of two of the frames, the infrequently-used letters "Q" and "X" are associated, respectively, with the letters "W" and "K", in the same manner as that appearing on the key or pattern 1. Several sets of these frames are furnished with each set of sixteen game pieces or tokens to enable the frames to be used when duplicate letters appear in the same word.

In connection with the frame 16 above described, I provide a box or container 18 within which is positioned a ledge 19 adapted to support thereon a plurality of the frames 16. The width of the ledge 19 is less than the width of the borders of the frame 16 and the bottom of the box or container 18 is preferably provided with a centrally positioned opening 20 for a purpose to be hereinafter described.

Referring now to the use of the frames 16 and the associated box or container 18, it will be noted that a plurality of these frames can be arranged in superimposed relation in a manner such that the inwardly extending projections 17 occupy positions corresponding to the relative positions of the notches 7 on any of the game pieces or tokens 3. For example, I have illustrated in Fig. 15 five of the frames 16 arranged in accordance with the letters appearing in the word "ZEBRA." These five frames, arranged as shown, are placed within the box or container 18 and are supported on the ledge 19 therein, with the inwardly extending projections 17 positioned in accordance with the letters "Z", "E", "B", "R" and "A". An instructor or teacher, after arranging these five frames in the manner specified and within the box 18, will then call upon a child or pupil to spell the word "ZEBRA" and to select the particular game piece or token 3 on which the word "ZEBRA" appears. The child or pupil will select what he believes to be the proper game piece or token and will endeavor to place it in the box or container 18. If a proper selection has been made, the game piece or token will pass freely into the box or container, as its five notches 7 will pass freely over the correspondingly positioned projections 17. The game piece or token which has passed into the box or container 18 will be readily removed therefrom by moving the finger through the opening 20 and pushing the game piece or token upwardly. If the child or pupil has not selected the proper game piece or token, i. e., has selected, for example, the game piece or token bearing the word "ZEROS," such game piece or token will not, of course, pass into the box or container 18 through the frames 16 which have been assembled as above described for the word "ZEBRA," as, obviously, the relative positions of the notches 7 on the improperly selected game piece or token will not correspond to the position of the projections 17 on the superimposed frames. This feature of my present invention provides an educational and instructive device by means of which a child or pupil can be readily instructed in the selection of the letters which constitute a selected word, for example, the letters (not necessarily the sequence of letters) which constitute the word "Zebra." and provides a novel means by which such letter selection can be readily "checked."

It will be understood that the several forms of my present invention herein shown and described are to be taken as preferred embodiments of the invention and that numerous changes may be made in the shape, size and arrangement of parts without departing from the spirit of my invention or the scope of the subjoined claims. While I have elected to illustrate and describe the game pieces or tokens as being square in plan, it is to be understood that these game pieces or tokens may be of any desired polygonal form having edges of a sufficient length to accommodate the indicating or "checking" notches 7. The key or pattern I need not necessarily be square in plan but may also be of any desired polygonal form corresponding to the form of the game pieces or tokens 3. It is to be understood, further, that I have illustrated and described my present invention in connection with five-letter words but, obviously, the invention is not so restricted but is applicable to the provision of game pieces or tokens having on the face thereof words including a greater or lesser number of individual letters. The indicating or "checking" means provided by my present invention need not be in the form of notches 7, but may consist of any suitable identifying marks or symbols placed adjacent the edges of the game pieces or tokens in accordance with the relative positions of the letters appearing on the game pieces or tokens.

Having thus described my invention, what I claim as new and desire to secure by Letters Patent is:

1. An amusement and educational device comprising a set of at least four game pieces adapted for arrangement in a predetermined order or sequence in two or more vertical and horizontal rows in accordance with indicia appearing thereon, each game piece having a plurality of indicating means thereon adapted to register with like indicating means on an adjacent game piece in the vertical and horizontal rows when said game pieces are properly arranged in said rows, the positions of said indicating means on said game pieces having a definite predetermined relation to the indicia appearing on said game pieces.

2. An amusement and educational device comprising a set of at least four game pieces adapted for arrangement in a predetermined order or sequence in two or more vertical and horizontal rows in accordance with words appearing thereon, each game piece having a plurality of indicating means thereon positioned in accordance with the letters comprising the word appearing thereon, the plurality of indicating means of each game piece adapted to register with like indicating means on an adjacent game piece in the vertical and horizontal rows when said game pieces are properly arranged in said rows.

3. An amusement and educational device comprising a set of at least four game pieces adapted to be arranged in a predetermined order or sequence in two or more vertical and horizontal rows in accordance with indicia appearing thereon, each game piece having a plurality of indicating notches on the edges thereof adapted to register with like notches on an adjacent game piece in the vertical and horizontal rows when said game pieces are properly arranged in said rows.

4. An amusement and educational device comprising a set of at least four game pieces adapted to be arranged in a predetermined order or sequence in two or more vertical and horizontal rows in accordance with words appearing thereon, each game piece having a plurality of indicating notches on the edges thereof positioned in accordance with the letters comprising the word appearing thereon, the indicating notches on each game piece adapted to register with like indicating notches on an adjacent game piece in the vertical and horizontal rows when said game pieces are properly arranged in said rows.

5. An amusement and educational device comprising a set of at least four game pieces each containing on a face thereof a portion of a composite picture or design, said game pieces adapted for arrangement in predetermined order or sequence in vertical and horizontal rows to produce said composite picture or design, and a plurality of indicating means adjacent the edges of each game piece adapted to register with like indicating means on adjacent game pieces in the vertical and horizontal rows when said game pieces are properly arranged in said rows to produce said composite picture or design.

6. An amusement and educational device comprising a set of at least four game pieces each including on a face thereof a portion of a composite picture or design, said game pieces adapted for arrangement in predetermined order or sequence in vertical and horizontal rows to produce said composite picture or design, and a plurality of indicating means adjacent the edges of each game piece adapted to register with like indicating means on adjacent game pieces in the vertical and horizontal rows when said game pieces are properly arranged in said rows to produce said composite picture or design, said plurality of indicating means comprising a part of said composite picture.

7. An amusement and educational device comprising a set of at least four game pieces each including on a face thereof a portion of a composite picture or design, said game pieces adapted for arrangement in horizontal and vertical rows in a predetermined order or sequence to produce said composite picture or design, and a plurality of indicating notches on the edges of each game piece adapted to register with like notches on game pieces in adjacent horizontal and vertical rows when said game pieces are properly arranged in said rows to produce said composite picture or design, said indicating notches, when the game pieces are properly arranged in said rows, comprising a part of said composite picture or design.

8. An amusement and educational device comprising a game piece having a word on a face thereof, a plurality of indicating notches on the edges of said game piece positioned in accordance with the letters of said word, and a series of frames adapted to be assembled in superimposed relation, each of said frames having an opening therein corresponding in size and shape to said game piece and each having an inwardly extending projection positioned in accordance with the letters of the word on said game piece whereby said game piece may be passed through said series of superimposed frames with the notches passing over said inwardly extending projections.

9. An amusement and educational device comprising a game piece having a word on a face thereof, indicating notches on the edges of said game piece positioned in accordance with the letters of said word, a series of frames adapted to be assembled in superimposed relation, each of said frames having an opening therein corresponding in size and shape to said game piece and each having an inwardly extending projection positioned in accordance with the letters of said word, whereby said game piece may be passed through said series of superimposed frames with the notches passing over said inwardly extending projections, and a box for supporting said superimposed frames and for receiving the game piece passed through said frames.

10. A game piece having a word on a face thereof containing a definite number of letters and having a plurality of indicating notches on at least two of its opposite edges positioned in accordance with the letters in said word and having an extra indicating notch along one of its edges in alignment with one of the notches on the opposite edge of said game piece, and means for selectively covering and uncovering said extra notch and simultaneously uncovering and covering the aligned notch on the edge of the game piece opposite said extra notch.

FRANK J. MANHART.